US010211677B2

(12) United States Patent
Riehl et al.

(10) Patent No.: US 10,211,677 B2
(45) Date of Patent: Feb. 19, 2019

(54) WIRELESS POWER TRANSFER THROUGH METAL OBJECTS

(71) Applicant: MediaTek Inc., Hsin-Chu (TW)

(72) Inventors: Patrick Stanley Riehl, Lynnfield, MA (US); Vladimir A. Muratov, Manchester, NH (US)

(73) Assignee: MediaTek Inc., Hsin-Chu (TW)

( * ) Notice: Subject to any disclaimer, the term of this patent is extended or adjusted under 35 U.S.C. 154(b) by 87 days.

(21) Appl. No.: 15/275,841

(22) Filed: Sep. 26, 2016

(65) Prior Publication Data

US 2017/0207661 A1 Jul. 20, 2017

Related U.S. Application Data

(60) Provisional application No. 62/280,738, filed on Jan. 20, 2016.

(51) Int. Cl.
*H02J 50/12* (2016.01)
*H02J 50/90* (2016.01)
*H02J 7/02* (2016.01)
*H04B 5/00* (2006.01)

(52) U.S. Cl.
CPC ............ *H02J 50/12* (2016.02); *H02J 7/025* (2013.01); *H02J 50/90* (2016.02); *H04B 5/0037* (2013.01); *H04B 5/0075* (2013.01)

(58) Field of Classification Search
CPC . H02J 50/12; H02J 50/90; H02J 7/025; H04B 5/0037; H04B 5/0075
USPC .......................................................... 307/104
See application file for complete search history.

(56) References Cited

U.S. PATENT DOCUMENTS

| 2013/0205582 | A1* | 8/2013 | Singh | H01F 41/00 29/602.1 |
|---|---|---|---|---|
| 2014/0295199 | A1* | 10/2014 | Baarman | C08L 63/00 428/565 |
| 2015/0048752 | A1* | 2/2015 | Van Den Brink | H02J 5/005 315/246 |
| 2015/0076922 | A1* | 3/2015 | Kato | H02J 5/005 307/104 |
| 2015/0318711 | A1* | 11/2015 | Moon | H01Q 1/38 307/104 |

(Continued)

FOREIGN PATENT DOCUMENTS

| CN | 105706334 A | 6/2016 |
|---|---|---|
| TW | 201347344 A | 11/2013 |

(Continued)

OTHER PUBLICATIONS

Extended European Search Report for Application No. 17152259.2 dated Jun. 8, 2017.

(Continued)

*Primary Examiner* — Daniel Kessie
*Assistant Examiner* — Swarna N Chowdhuri
(74) *Attorney, Agent, or Firm* — Wolf, Greenfield & Sacks, P.C.

(57) ABSTRACT

A mobile device includes a housing having a conductive region and a wireless power receiver having a receive coil configured to receive wireless power through the conductive region. The thickness of the conductive region is less than $\delta/10$, wherein $\delta$ is a skin depth of the conductive region at a primary frequency of an electromagnetic signal that provides the wireless power.

19 Claims, 4 Drawing Sheets

(56) References Cited

U.S. PATENT DOCUMENTS

2016/0006259 A1* 1/2016 Ogawa .................. H02J 50/10
                                                     307/104
2016/0006293 A1   1/2016 Jeong et al.
2017/0207661 A1* 7/2017 Riehl .................... H02J 50/12
                                                     307/104

FOREIGN PATENT DOCUMENTS

| TW | 201347349 A | 11/2013 |
| TW | 201436494 A | 9/2014 |
| WO | WO 2013/056021 A1 | 4/2013 |
| WO | WO 2013/103948 A2 | 7/2013 |

OTHER PUBLICATIONS

Jeong et al., Enabling wireless power transfer though a metal encased handheld device. IEEE Wireless Power Trans Conf. May 5, 2016; 1-3, XP032916203, DOI: 10.1109/WPT.2016.7498817 [retrieved on Jun. 23, 2016].

* cited by examiner

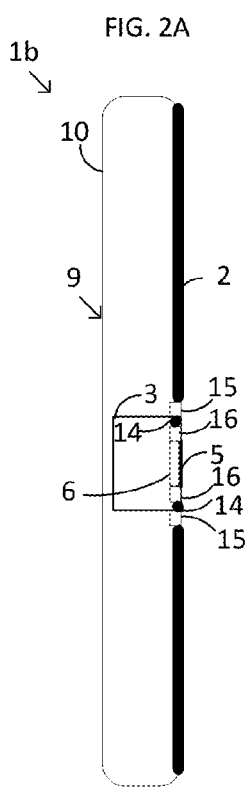
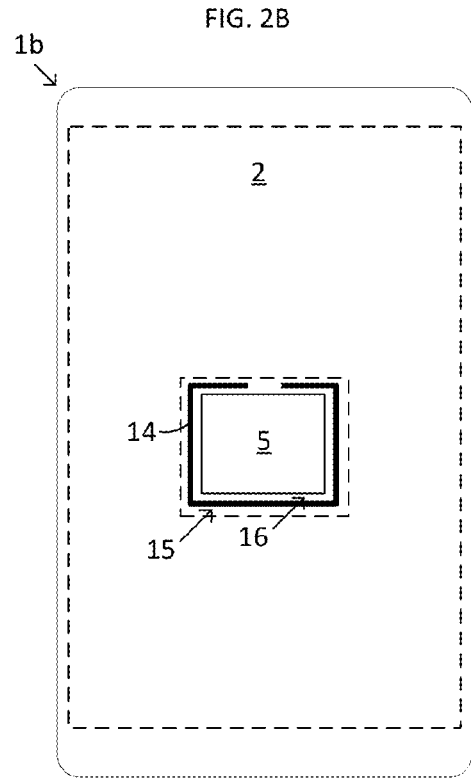
FIG. 2A   FIG. 2B
FIG. 3A   FIG. 3B

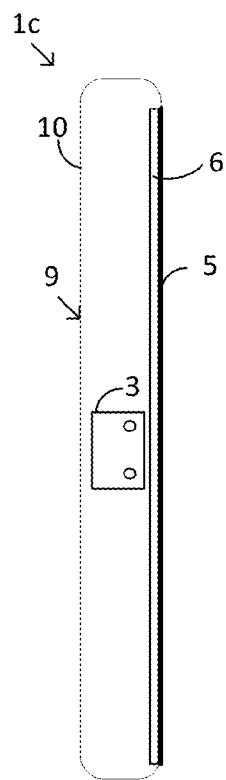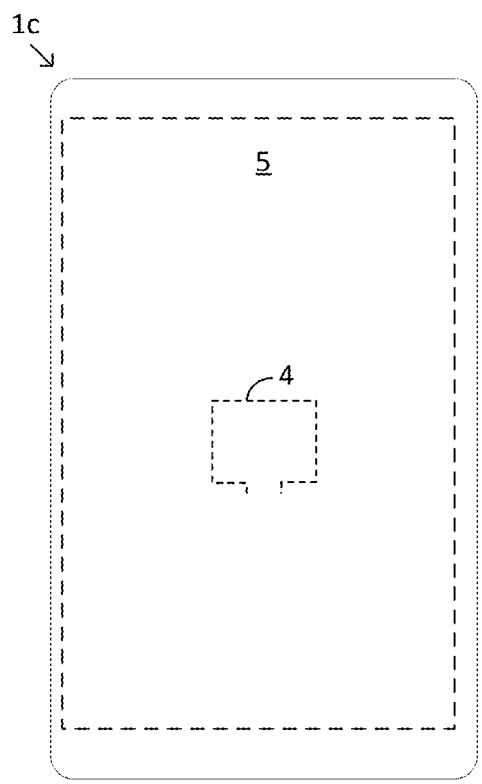
FIG. 4A  FIG. 4B
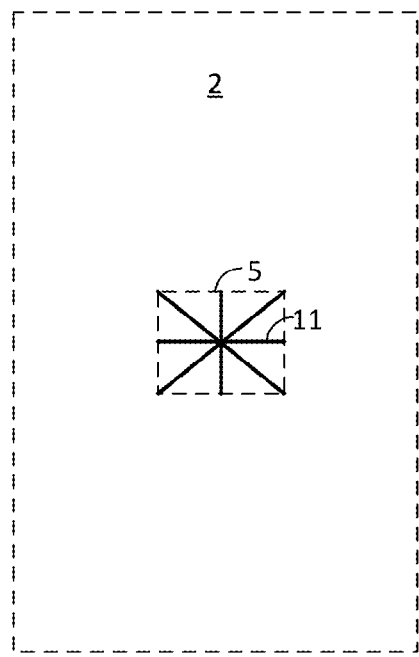
FIG. 5

WIRELESS POWER TRANSFER THROUGH METAL OBJECTS

CROSS-REFERENCE TO RELATED APPLICATIONS

This application claims priority to U.S. provisional application Ser. No. 62/280,738, filed Jan. 20, 2016, titled "Wireless Power Transfer Through Metal Objects," which is hereby incorporated by reference in its entirety.

BACKGROUND

1. Technical Field

The techniques described herein relate generally to wireless power delivery, and particularly to transmission of power wirelessly through a metal object.

2. Discussion of the Related Art

Wireless Power Transfer Systems (WPTS) are gaining increasing popularity as a convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

Some embodiments relate to a mobile device comprising a housing including a conductive region and a wireless power receiver having a receive coil configured to receive wireless power through the conductive region. The thickness of the conductive region is less than $\delta/10$, wherein $\delta$ is a skin depth of the conductive region at a primary frequency of an electromagnetic signal that provides the wireless power.

The thickness of the conductive region may be less than $\delta/20$.

The thickness of the conductive region may be less than $\delta/40$.

The conductive region may be aligned with the receive coil.

The conductive region may comprise a metal.

The metal may comprise at least one of copper, aluminum, steel or nickel.

The thickness may be 100 microns or less.

The conductive region may be at a back of the mobile device.

The mobile device may further comprise a user interface at a front of the mobile device.

The conductive region may be at an exterior of the mobile device.

The conductive region may be a first conductive region at a back of the mobile device, and the housing may further include: a second conductive region at the back of the mobile device, the second conductive region comprising a metal having a thickness greater than $\delta_2/40$, wherein $\delta_2$ is a skin depth of the second conductive region. The second conductive region may extend across an area outside of the first conductive region. The first conductive region may have an area that overlaps with the receive coil. The first conductive region may form a window in the second conductive region to allow wireless power transfer to the receive coil through the first conductive region.

The receive coil may be at an interior of the mobile device.

The receive coil may be at a back of the mobile device.

The receive coil may be formed of the same metal as the second conductive region.

The mobile device may further comprise one or more insulating regions to isolate the receive coil from the first and second conductive regions.

The second conductive region may extend across a majority of an area of the back of the mobile device.

The mobile device may further comprise a non-conductive support that supports the conductive region.

The mobile device may further comprise a plurality of ribs extending across the conductive region and providing support for the conductive region.

The plurality of ribs may be conductive.

The plurality of ribs may be formed of a same metal as a metal back cover of the mobile device.

The area of the conductive region may be no more than 150% of an area subtended by the receive coil.

The thickness of the metal layer may be greater than 0.01 µm, such as greater than 0.1 µm or greater than 1 µm.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIGS. 2A and 2B show a side view and a back view of a mobile device 1a having a conductive region on the back of the mobile device 1a to facilitate wireless power transfer, according to some embodiments.

FIGS. 3A and 3B show a side view and a back view of a mobile device 1b, according to some embodiments in which a transmit coil is formed of the same metal as a metal back layer of the mobile device.

FIGS. 4A and 4B show a side view and a back view of a mobile device 1c, according to some embodiments, in which the conductive region on the back of the mobile device 1a that facilitates wireless power transfer extends across a majority of the area of the back of the mobile device.

FIG. 5 illustrates ribs to provide mechanical support for a thin conductive layer.

DETAILED DESCRIPTION

Metal back covers are a popular feature in mobile electronic devices such as smart phones and tablet computers.

Unfortunately, a metal back cover acts to shield electronics inside the mobile device from electromagnetic fields, which prevents wireless power transfer to the mobile device using electromagnetic waves.

The inventors have recognized and appreciated that if the thickness of the metal back cover is substantially less than a skin depth at the frequency of wireless power transfer, the metal back cover will be substantially transparent to the electromagnetic fields produced by the wireless power transmitter. The skin depth δ in a material is given by the following equation, where f is the frequency, μ is the magnetic permeability of the material and 6 is the electrical conductivity of the material.

$$\delta = \frac{1}{\sqrt{\pi f \mu \sigma}},$$

A larger skin depth is desirable to improve the transmission of electromagnetic fields through a metal back cover. To achieve a condition δ>>T, where the skin depth δ is much greater than the thickness T of the metal back cover, the conductivity and/or thickness T of the metal back should be selected to be sufficiently small.

Table 1 below lists the conductivity of several exemplary materials for the metal back cover as well as their skin depth at two commonly selected frequencies for wireless power transmission, 175 k kHz and 6.78 MHz.

TABLE 1

| Material | Conductivity (MS/m) | Skin Depth @ 175 kHz (um) | Skin Depth @ 6.78 MHz (um) |
|---|---|---|---|
| Copper | 58.5 | 155 | 25 |
| Aluminum | 36.9 | 196 | 31 |
| 316 Stainless Steel | 1.32 | 1046 | 160 |

As shown above, stainless steel may be advantageous over aluminum or copper due to its lower conductivity, and thus higher skin depth. Nickel is another suitable material. However, aluminum or copper may be used if made sufficiently thin.

Figure 1A:
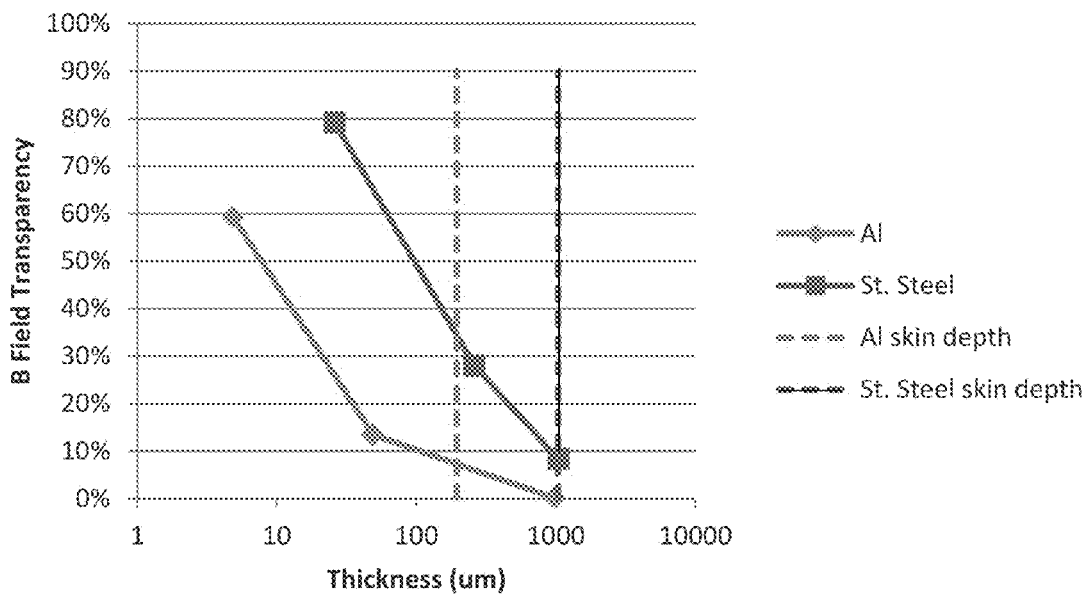
FIG. 1A shows the B-field transparency for aluminum and stainless steel layers of various thicknesses at a wireless power transmission frequency of 175 kHz.
Figure 1B:
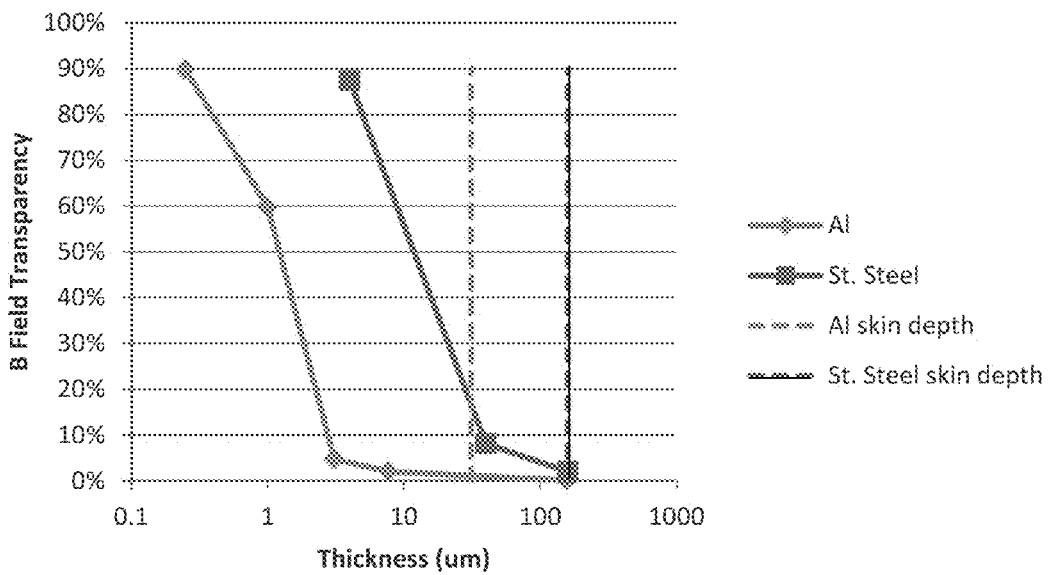
FIG. 1B shows the same simulation at a wireless power transmission frequency of 6.78 MHz.

Simulations were performed to assess the attenuation of magnetic field through metal layers of different materials and thicknesses. FIG. 1A shows the B-field transparency for aluminum and stainless steel layers of various thicknesses at a wireless power transmission frequency of 175 kHz. The term "transparency" refers to the ratio of the B-field on either side of the metal layer. A higher transparency means that more of the B-field passes through the metal layer. As shown in FIG. 1A, stainless steel is more transparent than aluminum for a given thickness, due to its larger skin depth. The skin depths for aluminum and stainless steel are also shown in FIG. 1A. When the thickness of the metal layer is less than δ/40, most of the B-field passes through the metal layer. Smaller degrees of transparency are seen at δ/20 and δ/10 which may be suitable for some applications. At 175 kHz, to have 50% of the B-field pass through the metal layer the thickness would need to be at 10 μm or less in the case of aluminum or 100 μm or less in the case of stainless steel. FIG. 1B shows the same simulation at a wireless power transmission frequency of 6.78 MHz. Qualitatively similar results were obtained. Again, when the thickness of the metal layer is less than δ/40, most of the B-field passes through the metal layer. Due to the higher frequency, a smaller metal layer thickness may be needed to provide the same transparency as seen at 175 kHz. At 6.78 MHz, to have 50% of the B-field pass through the metal layer the thickness would need to be 1-2 μm or less in the case of aluminum or 10-20 μm or less in the case of stainless steel. In some embodiments, the thickness of the metal layer may be selected to be less than δ/10, such as δ/20 or less, or δ/40 or less. In some embodiments, the thickness of the metal layer may be greater than 0.01 μm, such as greater than 0.1 μm or greater than 1 μm.

FIGS. 2A and 2B show a side view and a back view, respectively, of a mobile device 1a having a conductive layer 2 on the back of the housing 10 of mobile device 1a. The conductive layer 2 may extend across a majority of the area of the back of the mobile device. Conductive layer 2 may include metal, and may be thick enough and have high enough conductivity to prevent the transmission of wireless power therethrough. As shown, the mobile device may have a wireless power receiver 3 having a receive coil 4. The wireless power receiver 3 is configured to receive an AC signal from the receive coil 4 and process it to produce a DC voltage, for example, which may be used to charge a battery of the mobile device 1a and/or to power the mobile device 1a. To enable the transmission of electric and/or magnetic fields to the receive coil 4, the back of the mobile device 1a may have a conductive region 5 of increased transparency to electric and/or magnetic fields. Conductive region 5 may serve as a transparent "window" that allows electric and/or magnetic fields produced by a wireless power transmitter to pass through the back of the mobile device 1a to the receive coil 4 of the wireless power receiver 3. As discussed above, the conductive region 5 may be a metal. Examples of suitable metals include stainless steel, nickel, aluminum and copper. However, the devices described herein are not limited to these metals. In some embodiments, the thickness of the conductive region 5 (along the horizontal dimension of FIG. 2A) may be less than δ/10, such as δ/20 or less, or δ/40 or less, where δ is the skin depth of conductive region 5. In some embodiments at least 50% of the area of the receive coil 4 (as viewed from the back of the mobile device) may be covered by conductive region 5 rather than conductive layer 2, to facilitate wireless power transfer to the receive coil 4. In some embodiments at least 75%, at least 90% or 100% of the area of the receive coil 4 (as viewed from the back of the mobile device) may be covered by conductive region 5. Conductive region 5 may be aligned with the receive coil to facilitate the overlap in area between conductive region 5 and the receive coil 4. In some embodiments, the area of the conductive region 5 may extend beyond the area of the receive coil, as shown in FIG. 2B.

The mobile devices described herein may be any suitable types of mobile devices, such as smartphones, tablet computers, or wearable devices such as smart watches, for example. Such mobile devices may have a user interface 9, such as a touch screen, on the front of the mobile device. The housing of the mobile device may be formed of any of a variety of materials, and may provide structural integrity for the mobile device. At the back of the mobile device the housing may have a metal layer at the exterior of the housing, which allows the user to see and feel metal at the back of the mobile device. In some embodiments, the techniques described herein can retain the look and feel of a metal back cover while enabling wireless power transfer through the back of the mobile device.

FIGS. 3A and 3B show a side view and a back view, respectively, of a mobile device 1b, according to some embodiments. In mobile device 1b the receive coil 14 of wireless power receiver 3 is formed of the same conductive material (e.g., in the same layer) as the conductive layer 2. An insulating region 15 on the back surface of the mobile device isolates the receive coil 14 from conductive layer 2. An insulating region 16 on the back surface of the mobile device isolates the receive coil 14 from the conductive region 5. As in mobile device 1a, conductive region 5 may serve as a transparent window that allows electric and/or magnetic fields produced by a wireless power transmitter to pass through the back of the mobile device 1b to the receive coil 14.

FIGS. 4A and 4B show a side view and a back view, respectively, of a mobile device 1c, according to some embodiments. In the mobile device 1c, the conductive region 5 extends across a larger area than in mobile device 1a and 1b. In mobile device 1c, conductive region 5 may extend across a majority of the area of the back of the mobile device. In mobile device 1c, no conductive layer 2 is present on the back surface of the mobile device. Accordingly, electric and/or magnetic fields produced by a wireless power transmitter can pass through the back of the mobile device 1a through conductive region 5. In some embodiments, the thickness of the conductive region 5 may be less than $\delta/10$, such as $\delta/20$ or less, or $\delta/40$ or less, where $\delta$ is the skin depth of conductive region 5.

To provide mechanical stability, optionally the conductive region 5 may be formed on a non-conductive support 6. Support 6 may be formed of any suitable material, such as plastic, for example. However, support 6 is optional. In some embodiments, the area of conductive region 5 may be made small enough such that it does not impact the mechanical stability of the housing, yet large enough to facilitate wireless power transfer. For example, in some embodiments, the area of the conductive region 5 may be less than 150% or less than 120% of the area subtended by the receive coil 5. In some embodiments, one or more conductive or non-conductive supports, or "ribs" may extend across the conductive region 5. FIG. 5 shows an embodiment in which ribs 11 extend across the conductive region 5. Ribs 11 may be elongated members of conductive or non-conductive material. In some embodiments, ribs 11 may be formed of the same material and thickness as conductive layer 2, such that ribs 11 overlie the conductive region 5 as seen from the back view of the mobile device. If the ribs 11 are conductive, they may be arranged in a pattern that avoids closed loops in the window 5 to avoid the induction of eddy currents. As an example, FIG. 5 shows ribs 11 having a star pattern that does not have closed loops within the window 5. However, in some embodiments, ribs 11 may be formed of non-conductive material, such as plastic. Ribs may be used in any embodiment described herein, such as the embodiments of FIGS. 2 and 3, for example. Ribs 11 may be arranged in any pattern, not limited to a star pattern.

Figure 6:
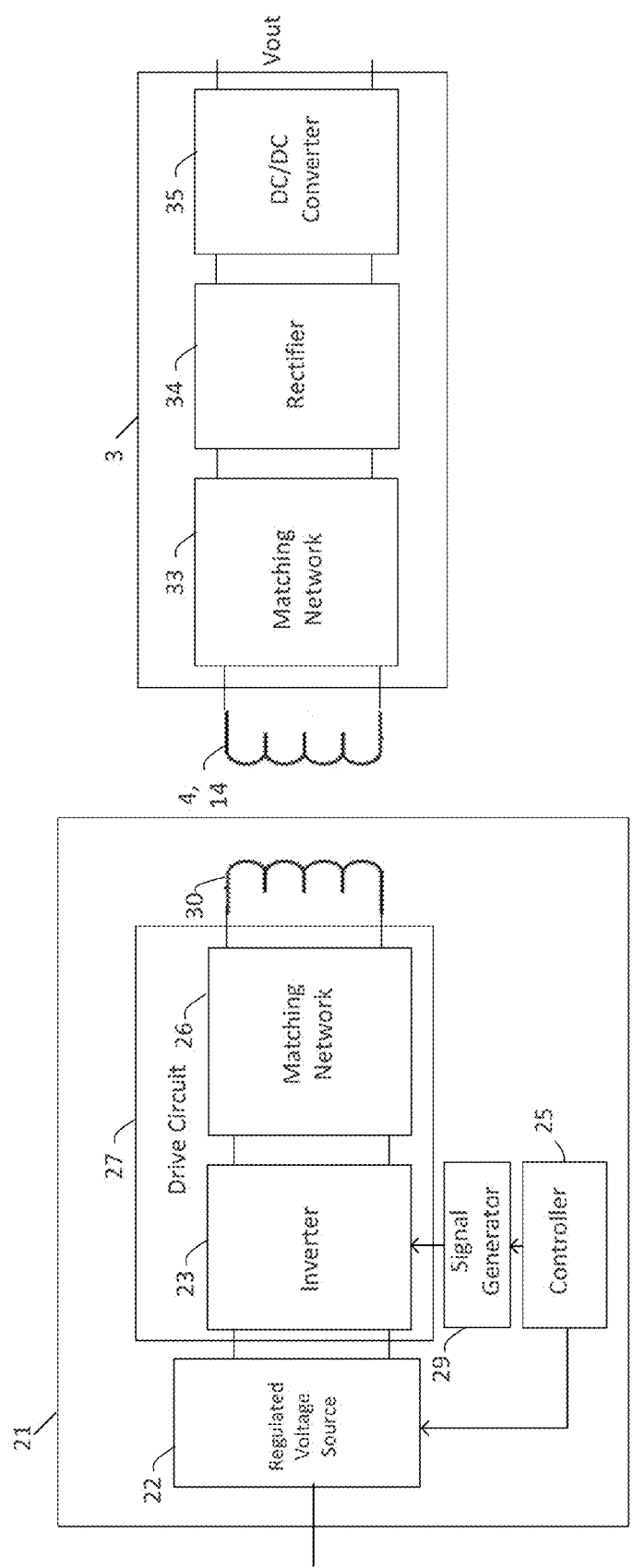
FIG. 6 shows a block diagram of a wireless power system including a wireless power transmitter and a wireless power receiver, according to some embodiments.

FIG. 6 shows a block diagram of a wireless power transfer system including a wireless power transmitter 21 and a wireless power receiver 3. The wireless power transmitter 21 has a drive circuit 27 including an inverter 23 that drives a transmit coil 30 through a matching network 26. The wireless power transmitter 21 may include a regulated voltage source 22 (e.g., a voltage regulator) that provides a regulated DC voltage to the inverter 23. The regulated voltage source 22 produces a regulated DC output voltage in response to control stimulus from the controller 25. In some embodiments, the drive circuit 27 may be a class D or E amplifier that converts the DC voltage at the input of inverter 23 into an AC output voltage to drive the transmit coil 30. Producing an AC output voltage enables wireless power transmission through electromagnetic induction. The controller 25 may control a signal generator 29 to drive the inverter 23 with signals of a selected wireless power transmission frequency. As an example, the inverter 23 may be switched at a frequency between 100 and 205 kHz to transmit power to a wireless power receiver designed to receive wireless power according to the Qi specification for low power Qi receivers and 80-300 kHz for medium power Qi receivers. The inverter 23 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 25 may be an analog circuit or a digital circuit. Controller 25 may be programmable, and may command signal generator 29 to produce signals at a desired transmission frequency based on stored program instructions, so that inverter 23 switches at the desired transmission frequency. Matching network 26 may facilitate wireless power delivery by presenting a suitable impedance to the inverter 23. The matching network(s) may have one or more capacitive or inductive elements or any suitable combination of capacitive and inductive elements. Since the transmit coil 30 may have an inductive impedance, in some embodiments the matching network 26 may include one or more capacitive elements, which, when combined with the impedance(s) of the transmit coil 30, presents an impedance to the output of inverter 23 suitable for driving the respective transmit coil. In some embodiments, the resonant frequency of the matching network 26 may be set equal to or approximately equal to the switching frequency of the inverter 23. The transmit coil 30 may be realized by any suitable type of conductors. The conductors may be wires, including solid wire or Litz wire, or patterned conductors, such as patterned conductors of a PC board or an integrated circuit.

The AC current in the transmit coil 30 generates an oscillating magnetic field in accordance with Ampere's law. The oscillating magnetic field induces an AC voltage into a receive coil 4, 14 of a wireless power receiver 3 in accordance with Faraday's law. The AC voltage induced in the receive coil 4, 14 is provided through a matching network 33 to a rectifier 34 that generates an unregulated DC voltage. Rectifier 34 may be a synchronous rectifier or may be implemented using diodes. The unregulated DC voltage is regulated using a DC/DC converter 35, the output of which may be filtered and provided to a load as output voltage Vout. In some alternate embodiments the DC/DC converter 35 can be replaced by a linear regulator or battery charger, or eliminated altogether.

As used herein, the phrase "frequency of wireless power transfer" and the like refer to the primary frequency at which wireless power is transmitted using an electromagnetic signal. The primary frequency is the frequency at which the highest amount of power is transmitted. Those of ordinary skill in the art will appreciate that when wirelessly transmitting power at a particular frequency one or more harmonics may also be present at lower power levels. The harmonics may be at higher frequencies which are multiples of the fundamental frequency. Since the skin depth depends upon frequency, the skin depth at the harmonics is different from the skin depth at the fundamental frequency. Since the fundamental frequency is the primary frequency at which wireless power is transferred, the skin depth at the fundamental frequency is the most significant criteria for selection of a thickness and/or type of material to allow wireless power transfer, as opposed to the skin depth at the harmonics.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A mobile device, comprising: a housing including a conductive region; and a wireless power receiver having a receive coil configured to receive wireless power through the conductive region, wherein a thickness of the conductive region is less than $\delta/10$, wherein $\delta$ is a skin depth of the conductive region at a primary frequency of an electromagnetic signal that provides the wireless powers wherein the conductive region is a first conductive region at a back of the mobile device, and the housing further includes: a second conductive region at the back of the mobile device, the second conductive region comprising a metal having a thickness greater than $\delta/40$, wherein $\delta$ is a skin depth of the second conductive region, wherein the second conductive region extends across an area outside of the first conductive region and the first conductive region has an area that overlaps with the receive coil, the first conductive region forming a window in the second conductive region to allow wireless power transfer to the receive coil through the first conductive region, wherein the receive coil is at a back of the mobile device, and wherein the receive coil is formed of the same metal as the second conductive region.

2. The mobile device of claim 1, wherein the thickness of the first conductive region is less than $\delta/20$.

3. The mobile device of claim 2, wherein the thickness of the first conductive region is less than $\delta/40$.

4. The mobile device of claim 1, wherein the first conductive region is aligned with the receive coil.

5. The mobile device of claim 1, wherein the first conductive region comprises a metal.

6. The mobile device of claim 5, wherein the metal comprises at least one of copper, aluminum, steel or nickel.

7. The mobile device of claim 6, wherein the metal comprises steel.

8. The mobile device of claim 7, wherein the thickness of the first conductive region is 100 microns or less.

9. The mobile device of claim 1, further comprising a user interface at a front of the mobile device.

10. The mobile device of claim 1, wherein the first conductive region is at an exterior of the mobile device.

11. The mobile device of claim 1, wherein the receive coil is at an interior of the mobile device.

12. The mobile device of claim 1, further comprising one or more insulating regions to isolate the receive coil from the first and second conductive regions.

13. The mobile device of claim 1, wherein the second conductive region extends across a majority of an area of the back of the mobile device.

14. The mobile device of claim 1, further comprising a non-conductive support that supports the first conductive region.

15. The mobile device of claim 1, further comprising a plurality of ribs extending across the first conductive region and providing support for the first conductive region.

16. The mobile device of claim 15, wherein the plurality of ribs are conductive.

17. The mobile device of claim 16, wherein the plurality of ribs are formed of a same metal as a metal back cover of the mobile device.

18. The mobile device of claim 1, wherein an area of the first conductive region is no more than 150% of an area subtended by the receive coil.

19. The mobile device of claim 1, wherein the thickness of the first conductive region is greater than 0.01 m.

* * * * *

UNITED STATES PATENT AND TRADEMARK OFFICE
CERTIFICATE OF CORRECTION

PATENT NO. : 10,211,677 B2
APPLICATION NO. : 15/275841
DATED : February 19, 2019
INVENTOR(S) : Patrick Stanley Riehl et al.

It is certified that error appears in the above-identified patent and that said Letters Patent is hereby corrected as shown below:

In the Claims

At Column 7, Claim 1, Line 34, delete the word "powers" and replace it with the word -- power --.

At Column 7, Claim 1, Line 39, after the word than, delete "δ/40" and replace it with -- $\delta_2/40$ --.

At Column 7, Claim 1, Line 39, after the word wherein, delete "δ" and replace with -- $\delta_2$ --.

At Column 8, Claim 19, Line 45, after the number 0.01, delete "m" and replace it with -- μm --.

Signed and Sealed this
Second Day of April, 2019

Andrei Iancu
*Director of the United States Patent and Trademark Office*